United States Patent
Ciaudelli et al.

(10) Patent No.: US 7,259,899 B2
(45) Date of Patent: Aug. 21, 2007

(54) NARROW ANGLE HOLOGRAM DEVICE AND METHOD OF MANUFACTURING SAME

(75) Inventors: Joseph J. Ciaudelli, Uncasville, CT (US); Ikuo Nakamura, Brooklyn, NY (US); Ana Maria Nicholson, Long Island City, NY (US)

(73) Assignee: Ciaudelli Productions, Inc., Uncasville, CT (US)

( * ) Notice: Subject to any disclaimer, the term of this patent is extended or adjusted under 35 U.S.C. 154(b) by 0 days.

(21) Appl. No.: 10/949,597

(22) Filed: Sep. 24, 2004

(65) Prior Publication Data

US 2005/0068596 A1 Mar. 31, 2005

Related U.S. Application Data (60) Provisional application No. 60/505,945, filed on Sep. 25, 2003.

(51) Int. Cl.
*G03H 1/22* (2006.01)
(52) U.S. Cl. .............................. 359/32; 359/25; 359/15; 283/86
(58) Field of Classification Search ................. 359/25, 359/15, 1, 2, 13, 22, 32, 33, 35; 283/86
See application file for complete search history.

(56) References Cited

U.S. PATENT DOCUMENTS

| 3,813,685 | A | * | 5/1974 | St. John ...................... 348/41 |
| 4,712,851 | A | * | 12/1987 | Fusek et al. ................... 359/1 |
| 4,820,006 | A | * | 4/1989 | Constant ...................... 359/32 |
| 5,706,106 | A | * | 1/1998 | Monaghan ..................... 359/1 |
| 6,377,370 | B1 | * | 4/2002 | Taketomi et al. ............. 359/15 |
| 6,559,948 | B1 | * | 5/2003 | Stenton ....................... 356/457 |

OTHER PUBLICATIONS

Y. Taketomi, T. Kubota, 'Deep image reconstruction of a reflection hologram using a fluorescent lamp', Proc. SPIE, vol. 3293, 1998, pp. 196-204.*

* cited by examiner

*Primary Examiner*—Arnel Lavarias
(74) *Attorney, Agent, or Firm*—Reed Smith LLP (57) ABSTRACT

A method of manufacturing a master for producing a hologram device. A first master is produced with a compensating angle. The second master is produced from the first master with an index matching material to reduce the interference pattern caused by internal reflections within the holographic plate of the master. The hologram device has a relatively narrow angle of reconstruction to provide visibility from a nearly perpendicular light source such as the headlight of an on-coming vehicle.

21 Claims, 14 Drawing Sheets

| Angle (degrees) | Color/Brightness |
| --- | --- |
| +18 | Invisible |
| +12 | Dim yellow |
| +6 | Bright yellow/orange |
| 0 | Very bright orange |
| -6 | Bright orange/red |
| -12 | Dim red |
| -18 | Invisible |

FIG. 8B

NARROW ANGLE HOLOGRAM DEVICE AND METHOD OF MANUFACTURING SAME

CROSS-REFERENCE TO RELATED APPLICATIONS

The present application claims benefit of the U.S. provisional patent application Ser. No. 60/505,945, filed Sep. 25, 2003, which is incorporated herein by reference.

TECHNICAL FIELD

This invention relates to holograms, and particularly a narrow angle hologram device and method of manufacturing the same.

BACKGROUND OF THE INVENTION

A hologram or hologram device is a device that includes a photosensitive film containing a recordation of a 3-dimensional image of a physical object. As is well-known, holograms generally become visible with an "angle of reconstruction". An angle of reconstruction is a well-known term in the holographic art to mean an angle at which a light beam strikes the surface of the hologram during recording of the object image with respect to a perpendicular line to the hologram surface.

Thus, when light from a light source strikes the hologram at the same angle of reconstruction the image was recorded at, the image becomes visible. In a conventional hologram 4, the angle of reconstruction AR is at least 45 degrees. As shown in FIG. 6B, the angle of reconstruction AR is 50 degrees. Basically, the light from a light source 2 is well above the hologram 4 and the viewer. In many applications, however, it may be advantageous to have a narrower angle of reconstruction. One such application, for example, may be a hologram road sign or house sign that illuminates when light from a vehicle strikes the hologram sign at near perpendicular angle to the hologram surface.

Thus, it would be desirable to provide a hologram device having a narrow angle of reconstruction and a method of manufacturing the same.

SUMMARY OF THE DISCLOSURE

According to the principles of the present invention, a hologram device having a narrow angle of reconstruction is provided. A photosensitive film is used to record a 3-dimensional holographic image of a physical object. The 3-dimensional holographic image has a narrow angle of reconstruction where the narrow angle is defined as a predefined angle that falls within a range of −30 degrees to +30 degrees, inclusive, relative to a perpendicular line to a surface of the photosensitive film. The 3-dimensional holographic image is recreated when a light illuminates the photosensitive film at the same narrow angle that was used to record the image.

In one aspect of the invention, a method of making such a narrow angle hologram using an index matching technique is disclosed. Typically, an index matching material is interposed directly behind the hologram device during the recording process. This is designed to dissipate light and prevent it from causing interference with the recorded image.

In another aspect of the invention, a method of making the narrow angle hologram using a predefined compensating angle is disclosed. In this case, an interim hologram device is used to initially record a 3-dimensional image. The image in the interim hologram device is transferred to a second hologram device, which is then used as a master to make multiple copies of the hologram. During the creation of the interim hologram device, the 3-dimensional image is recorded with an object beam at a preselected compensation angle relative to the perpendicular line to the surface of the interim hologram device. The predefined compensation angle is sufficiently low to substantially prevent the light used to reconstruct the 3-dimensional image from striking the second hologram device when the image is being transferred from the interim hologram device to the second hologram device. This feature also prevents noise from interfering with the image being recorded.

In another aspect of the invention, both the index matching technique and the predefined compensation angle features are used to make a distortion free hologram device with a relatively narrow angle of reconstruction, preferably less than 30 degrees.

DETAILED DESCRIPTION OF THE INVENTION

The present hologram invention uses a relatively narrow angle of reconstruction of less than 45 degrees, preferably at most 30 degrees. In the hologram embodiment shown in FIG. 6A, for use as road or house signs for viewing by drivers, the angle of reconstruction is about 10 degrees so that when the vehicle headlights illuminate the hologram device 20 (the number "7" in the example shown in FIG. 6A) at about 10 degrees to the perpendicular line from the hologram device, the image 6 reconstructed is at the maximum brightness which provides the widest viewing angle possible for the viewer.

Generally, a master hologram plate or device is used to mass produce hologram copies. Preferably, two master holograms are created with a first master hologram H1 being created first and the second master hologram H2 being created using the first hologram H1. The two masters H1 and H2 are used to remove as much interference as possible.

Hologram masters are typically made on a photosensitive glass plate exposed to laser light. In making the first master hologram Hi, inventors have discovered that selecting a certain predefined compensating angle between an object to be recorded and the holographic plate H1 during the original recording substantially reduces reflections and crosstalk during the transfer process to create the second master hologram H2.

In creating the second master hologram H2, inventors have also discovered that the laser beam incident to the holographic glass plate H2 at a relatively narrow reference beam angle relative to the perpendicular line to the hologram surface caused the light to reflect off the back face of the plate H2 and bounce between the faces of the glass, causing interference patterns such as several lines appearing throughout the hologram. According to the present invention, an optimized optical configuration was developed using an index matching technique to reduce the interference patterns caused by internal reflections within the holographic plate H2. In one embodiment, it can be achieved by applying a thin layer of index matching fluid between the second master hologram plate H2 and a very thick (e.g., ½ inch) glass plate or by suspending the holographic plate in a tank of the index matching fluid. Index matching is considered to be achieved when the system effectively acts as if the holographic plate is at least 4 times as thick, diffusing the light sufficiently so noise from back reflections is reduced by at least half. In the example of the thick glass plate, the thickness of the glass plate should be at least four times the thickness of the second master hologram H2. If an index matching fluid is used, then the depth of the fluid should be at least four times as much as the thickness of the second master hologram H2.

A narrow angle hologram is a three dimensional image of object that appears to a viewer when exposed to light from the front at an angle of less than or equal to thirty degrees from the perpendicular plane of the object. The second master H2 required to produce the hologram device 20 is created by a two step process. It is to be noted, however, that the steps in creating a first master H1 is preferred, but is an optional step.

In the first step, a first master hologram H1 is made from an object to be three dimensionally imaged. In the second step, the image from the H1 is transferred to the final master (H2). Both H1 and H2 are created by exposing a holographic plate to optically manipulated laser light in a darkened room.

Using a beam splitter, the laser is divided in two: a reference beam and an object beam. Each leg is redirected by mirrors and expanded with optics, preferably a spatial filter. The expanded beams are also collimated to stop their divergence and create a parallel wave front.

The reference beam goes directly to a holographic plate. In the production of the H1 hologram, the other leg, the object beam, is directed to the object, reflecting off of it onto the holographic plate H1. During the transfer process, the object beam reconstructs the image recorded on H1 onto the final hologram H2. The two beams meeting at the holographic plate create a wave interference pattern that records the amplitude and phase of the light reflecting off the object. The reference beam and object beam have the same path length to the holographic plate but differ in power by up to 20-to-1 ratio, preferably a 3-to-1 ratio. Polarization of the laser light should be preserved. This can be accomplished by keeping the angle between the incident and reflected beams perpendicular at each mirror.

Careful consideration needs to be made to avoid optical noise and physical vibration, which would distort or destroy the image. Possible vibration free configurations include using a pulse laser as the light source or affixing all components to a table isolated from structure-borne room noise. The former creates a high energy flash that freezes any microscopic movement. The latter can be created in an enclosed room with a vibration isolated optical table.

Figure 1:
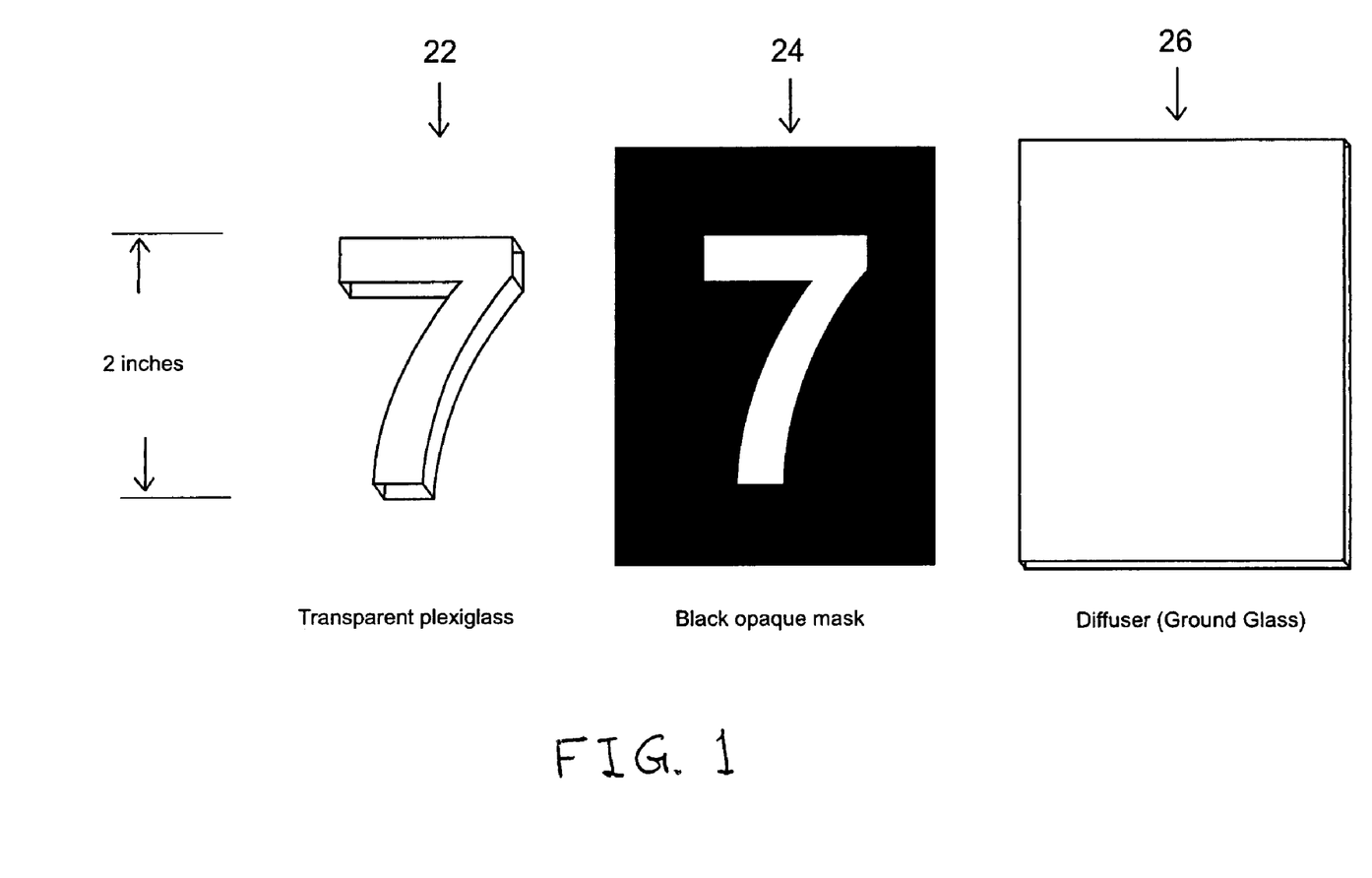
FIG. 1 illustrates an object being prepared to be three dimensionally imaged.
Figure 2:
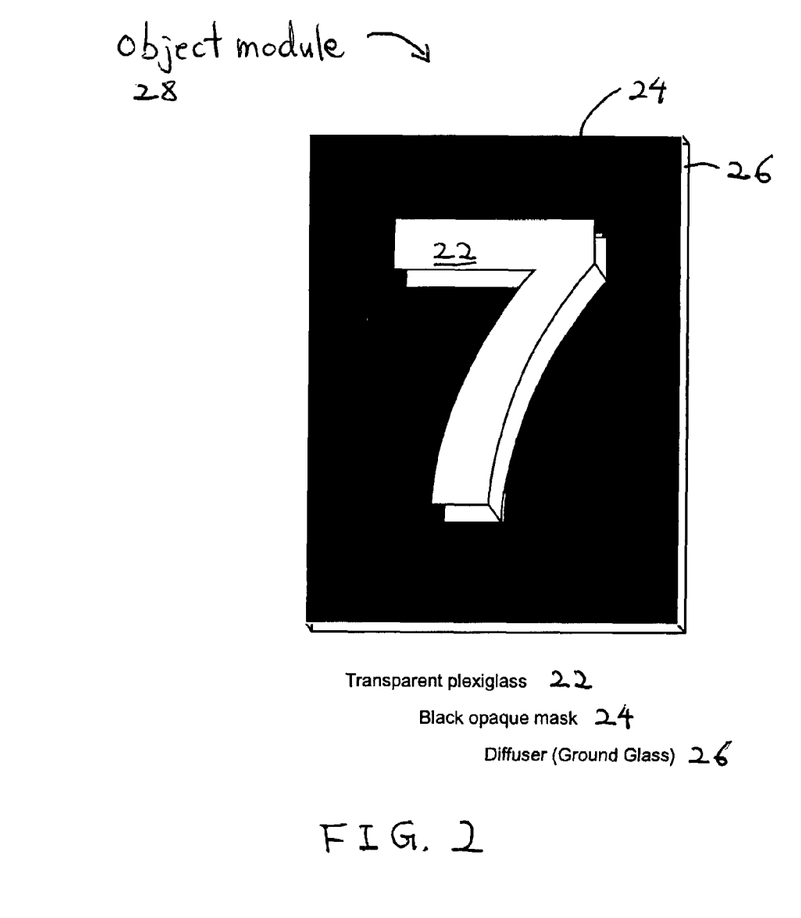
FIG. 2 illustrates the object of FIG. 1 inserted into a mask attached to ground glass.

The holographic plates are stored in light tight boxes until ready for exposure. After the exposures the plates are processed (typically using chemicals) to develop the recorded image and make them safe to be exposed to normal light levels. A detailed explanation of creating the first master H1, second master H2 and then the final hologram device 20 will now be explained in detail with reference to FIGS. 1-7. Referring to FIGS. 1 and 2, a three-dimensional object 22 (the number "7" in this example) of approximately 2 inches in height is formed from a transparent solid structure such as a transparent thermoplastic synthetic resin sold under the trade name of Plexiglas. Its front is coated with a clear dulling spray, creating a light diffusing finish, to avoid reflections of the laser light that would create optical noise. A black opaque mask 24 is made to outline the object 22. The object 22 and the mask 24 are mounted on ground glass 26 as shown in FIG. 2 to form an object module 28.

Figure 3:
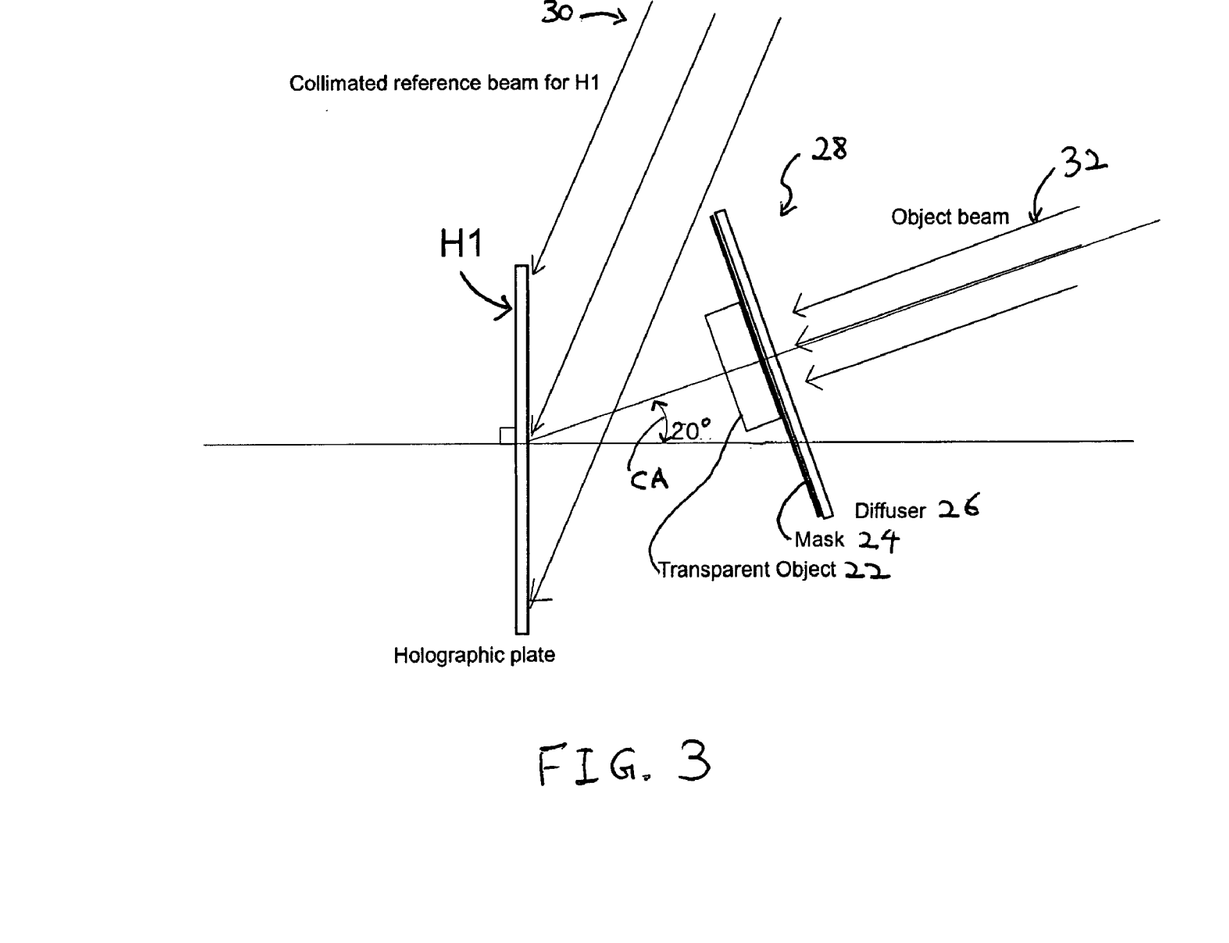
FIG. 3 illustrates a setup for making a first master hologram with a recorded holographic image of the object of FIG. 1 using a predefined compensating angle.

Referring to FIG. 3, the first master hologram H1 is created by recording the image of object 22 onto a holographic plate H1 with a laser and processing the exposed plate. The master hologram H1, H2 includes a plate (generally a glass plate) coated with a high contrast, high resolution, photosensitive emulsion.

A 1 Joule ruby pulse laser with a wavelength of 694 nm (not shown) was used to make the recording. The laser light goes through collimating optics (not shown) to make the light bundle parallel. Then the light goes through a beam splitter (not shown) which splits the collimated light into a reference beam 30 and an object beam 32. The reference beam 30 strikes the first master hologram H1 directly while the object beam 32 goes through the object module at a perpendicular angle to the object 22 and then strikes the first master hologram at a predefined compensation angle CA which is measured relative to a perpendicular line to the H1 surface. The compensation angle could be from 0 to 45 degrees.

The mounted object 22 is angled with respect to the perpendicular line of the first master hologram plate H1. This is done to prevent reflections and crosstalk of the laser light used to reconstruct the image recorded on H1 from hitting the H2 master during the transfer process. This compensating angle of 0 to 45 degrees is determined by the relative size of the first master hologram H1 and the second master hologram H2, and the distance between them during the transfer process. In the example shown, a 20 degree angle with respect to the perpendicular line of the holographic plate H1 was used for a 11.8"×7.9" H1 spaced 12" from a 5"×4" H2.

Once the exposed first master hologram H1 is processed, it becomes a laser viewable transmission hologram. The recorded image is reconstructed (becomes visible) when exposed to laser light from the rear at the same angle as the reference beam was set during the original recording.

Figure 4:
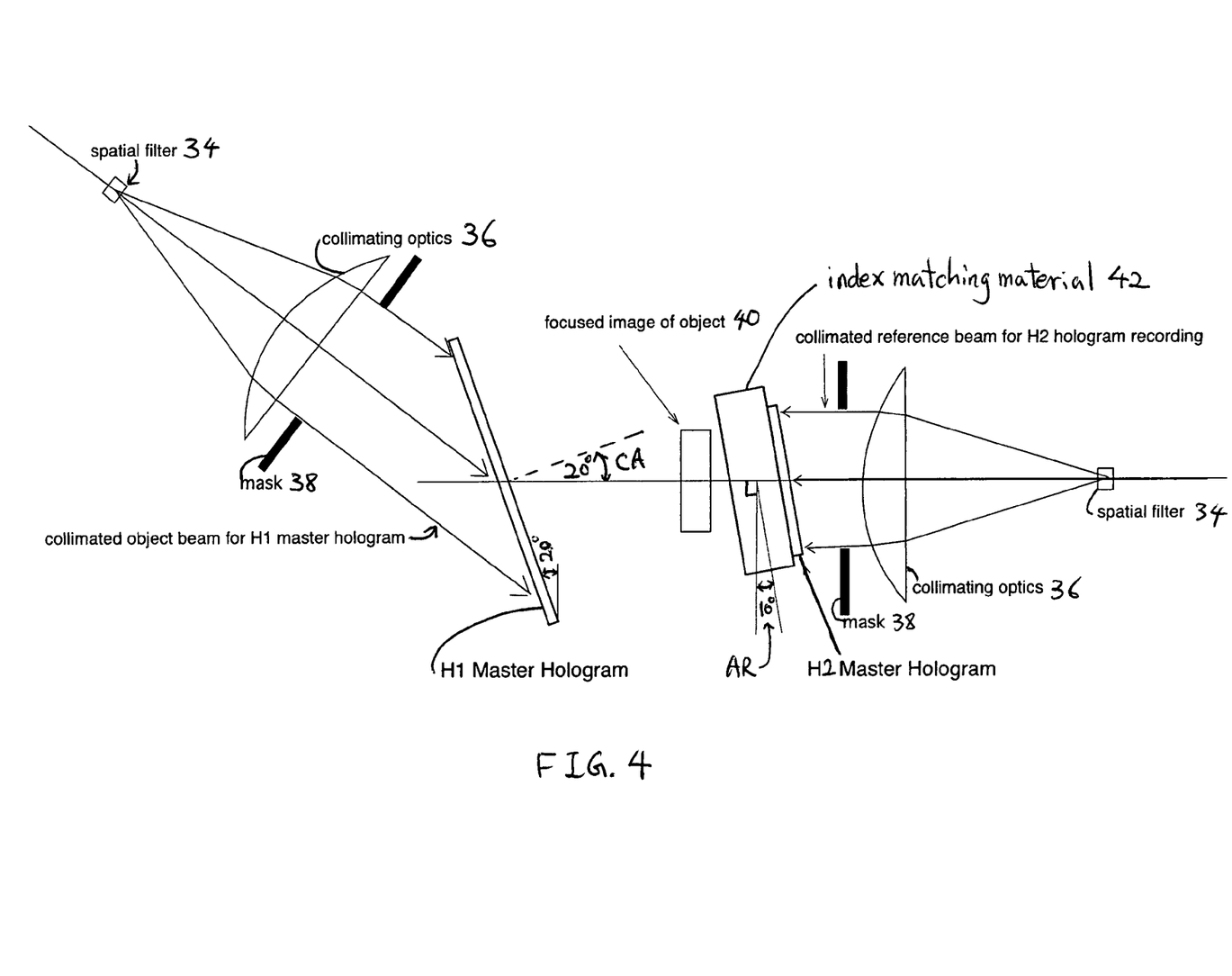
FIG. 4 illustrates a setup for making a second master hologram from the first master hologram of FIG. 3 using an index matching technique.

Referring to FIG. 4, the image recorded on the first master hologram H1 is reconstructed and transferred to the second master hologram H2 using a novel index matching technique, e.g., with an index matched material (see FIG. 5C) which has a similar index of refraction as that of the second master H2. The transfer of image from H1 to H2 effectively makes a hologram of the original hologram. The index matched materials that may be used in the present invention include glycerol, glass, mineral spirits, xylene, trichloroethylene or the like which have similar index of refraction as H2. Index matching is used when the reconstruction angle AR is 0 to 30 degrees, preferably 5 to 15 degrees for the hologram device created. 10 degrees was actually used in the embodiment shown.

For this second step, a 400 mW continuous wave green laser with a wavelength of 532 nm (not shown) was used. The image was slightly reduced in size from the original recorded object due to account for the difference in laser wavelengths when creating the two masters H1 and H2. The size would be matched if the same wavelengths were used in both steps.

The laser light goes through a spatial filter 34, collimating optics 36 and mask 38, which then strikes the rear surface of the first master hologram H1 at the same angle as the reference beam 30 relative to the H1 plate surface which was used in the first step of creating the first master hologram. That causes a focused image 40 of the object 22 recorded in the first master hologram H1 to be reconstructed.

At the same time, the same laser light goes through the spatial filter 34, collimating optics 36 and mask 38, and then strikes the surface of the second master hologram H2 at an angle of reconstruction AR which is measured relative to the perpendicular line to the second master hologram H2 surface. As shown, the angle of reconstruction AR used in FIG. 4 is 10 degrees. The image 40 reconstructed by the first master hologram H1 is then recorded in the second master hologram H2. Afterwards, the exposed second master hologram H2 is processed in a conventional manner.

In FIG. 4, the index matching material 42 which is positioned behind the rear surface of the second master hologram H2 as will be explained in more detail with reference to FIG. 5C.

As discussed above, the first step of creating the first master hologram H1 as shown in FIG. 3 is an optional step. If that step is omitted, then instead of the H1 master reconstructing the image 40, the physical object 22 (or the object module 28) would be positioned in the place where the image 40 would have been.

Figure 5A:
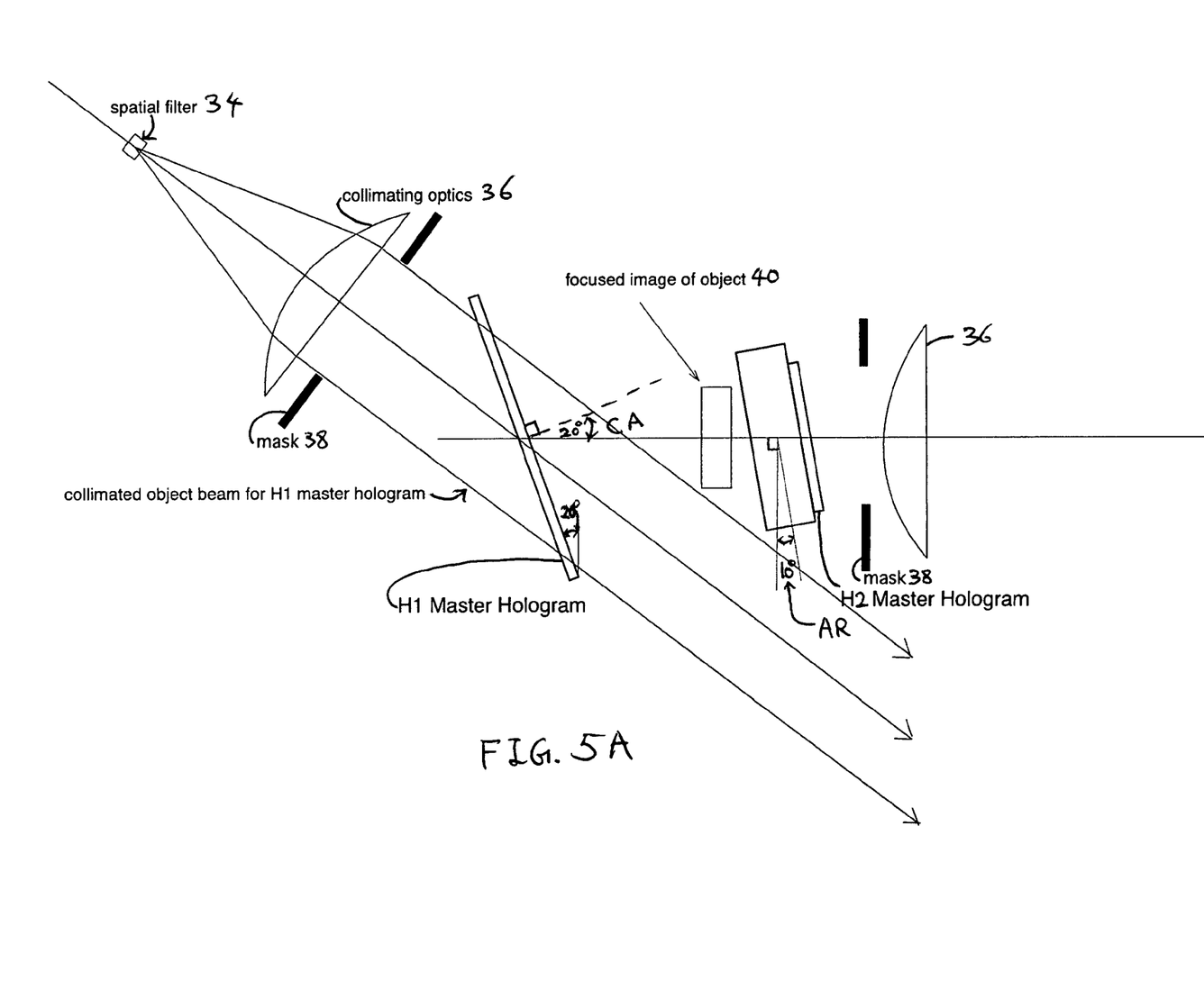
FIG. 5A illustrates the light path of a collimated object beam for making the second master of FIG. 4.

FIG. 5A shows that the compensating angle CA that was used to create the first master H1 is reversed. In other words, in FIG. 3, the object was tilted back by 20 degrees while in FIG. 4, the reconstructed image stands straight and the first master hologram H1 is tilted back by 20 degrees (CA). As can be seen, the compensation angle CA is carefully chosen to be sufficiently low such that the collimated object beam for the first master hologram H1 does not strike the second master hologram H2, which is sufficient to prevent crosstalk distortion that would occur if the beam used to reconstruct the image recorded on H1 were to strike the H2 plate.

Figure 5B:
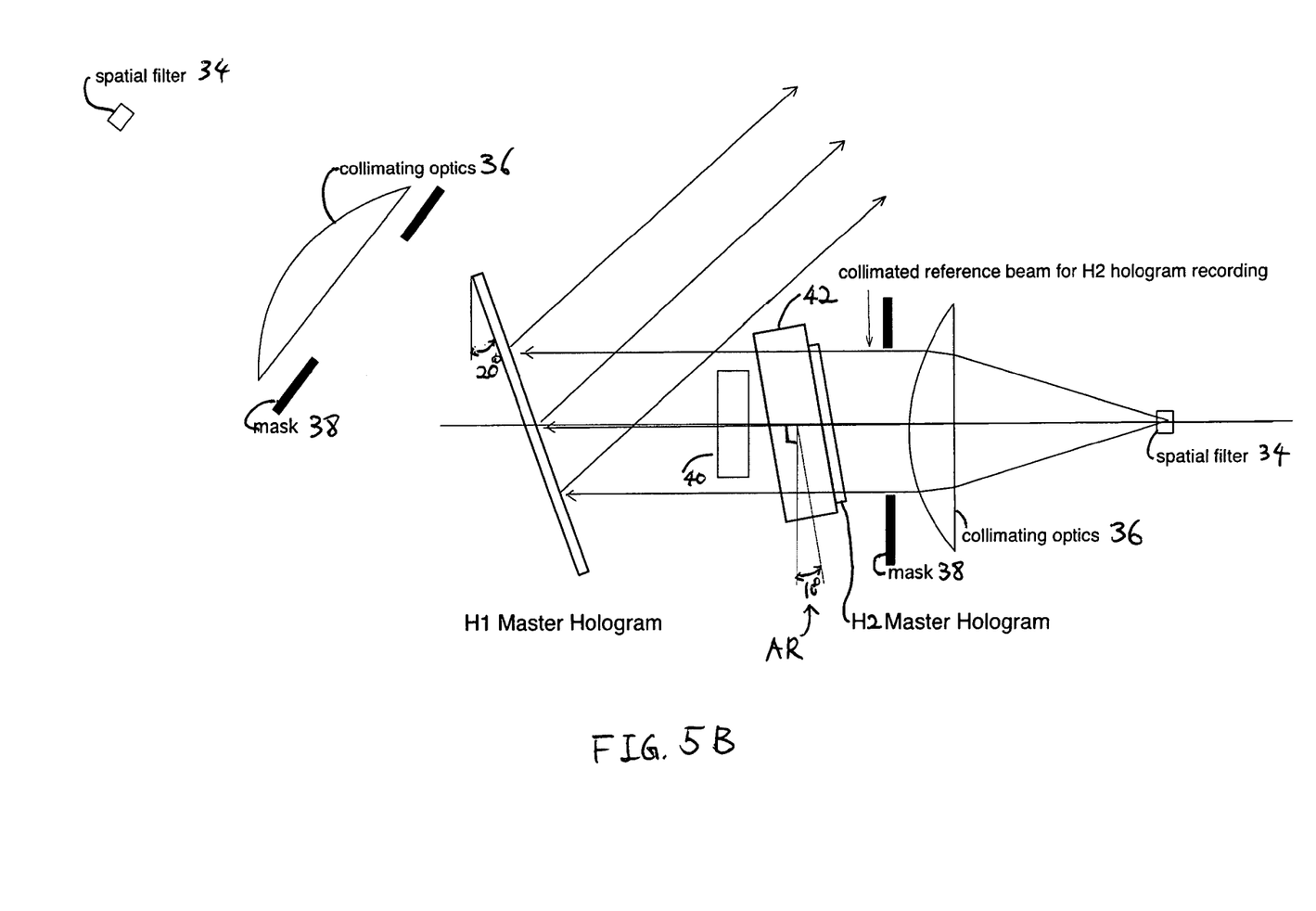
FIG. 5B illustrates the light path of a collimated reference beam for making the second master hologram of FIG. 4.

FIG. 5B shows that the compensating angle CA also prevents the collimated reference beam for creating H2 from reflecting off of H1 back onto the H2 plate.

Figure 5C:
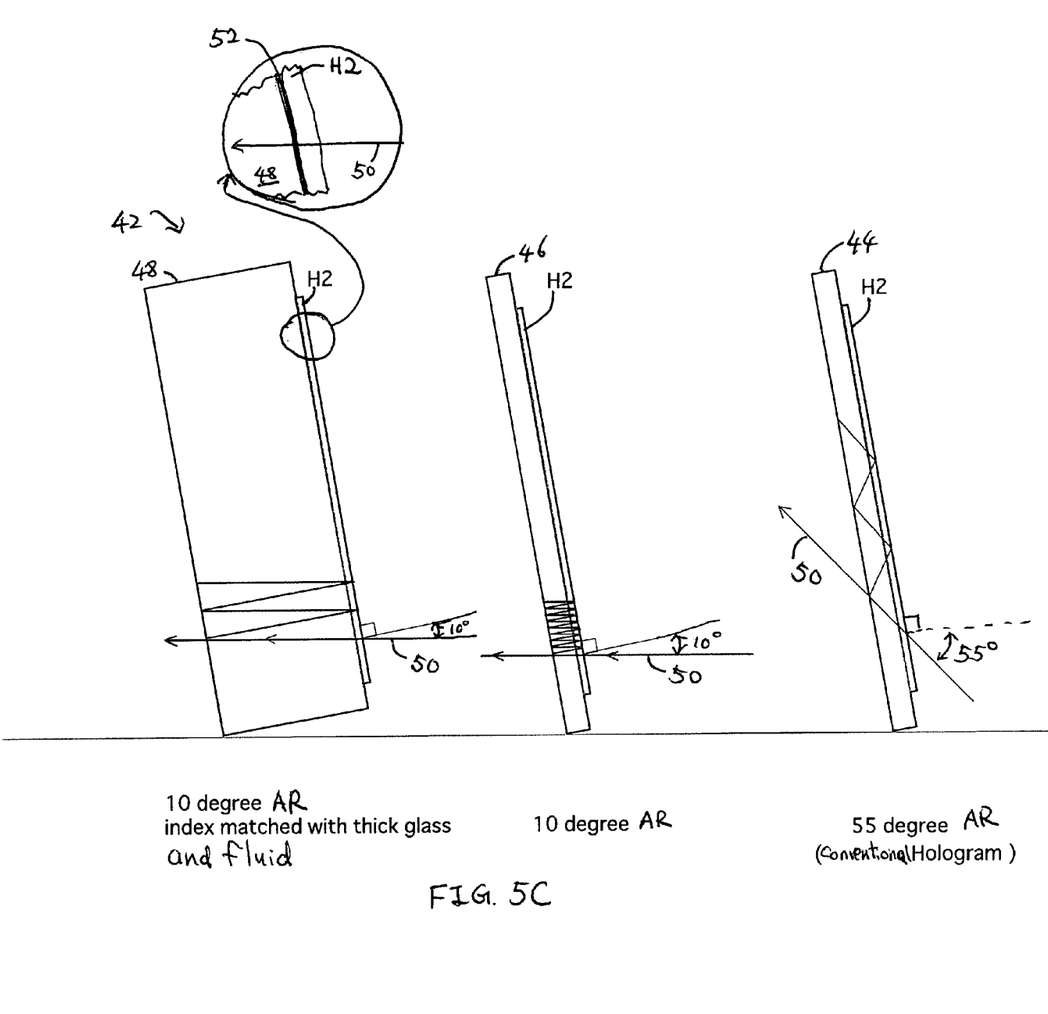
FIG. 5C illustrates a method of making the second master hologram according to a conventional method and according to the present invention.

Referring to FIG. 5C, the right most figure illustrates a conventional hologram device where the angle of reconstruction (reference beam angle with respect to the perpendicular line from a glass mount 44) is relatively wide at 55 degrees. In that case, even though there are some internal reflections within the glass mount 44 and holographic plate, they may not cause serious problems.

Referring to the middle figure in FIG. 5C, without index matching, the collimated reference beam 50 for the second master hologram H2 incident to a glass plate 46 is at a narrow angle (in this case 10 degrees) and the beam reflects off the back of the second master hologram plate H2 and bounces between the faces of the glass plate 46, causing fringe distortions (interference patterns consisting of several lines throughout the hologram).

In the left most figure and according to the present invention, the second master H2 is laid in a thin pool of a clear index matching fluid 52, such as mineral spirits, on top of a thick (more than ½ inch) glass plate 48 to reduce internal light reflections within the holographic plate. The thin layer of fluid 52 fills any small gaps that may exist between the glass plate 48 and H2. Alternately, the second master holographic plate H2 can be suspended in a tank filled with the index matching fluid 52 only. In the embodiment shown, the index of refraction for the thick glass plate 48, the fluid 52 and H2 are approximately 1.5. This "index matching" technique diffuses and dissipates the light 50 after it initially passes through the second master holographic plate H2, reducing the interference patterns caused by back reflections.

Using the index matching technique, the image recorded in the first master hologram H1 is transferred to the second master hologram H2. The H2 is processed to permanently fix the recorded image on the plate in a conventional manner. The second master hologram H2 is then used to make hologram copies 20.

One application of the above technique for manufacturing a master is in a hologram device containing a series of holograms such as number signs, with a narrow angle of reconstruction, that are combined to create an individual street address that projects out from the sign and illuminates (with no power required) from simply an oncoming vehicle's headlights, so that visitors or emergency vehicles can identify an address at night. The holograms 20 are recorded on transparent photosensitive film and applied over matching printed digits 54 as shown in FIG. 6A.

When light from an appropriate angle is not shining on the holograms, they are transparent and the printed number underneath is visible, so the address can be seen at all times. The mounting hardware installs on a mailbox, post, pole or tree and is vertically and horizontally adjustable for achieving the optimal angle to traffic for maximum brightness and clarity.

Figure 6A:
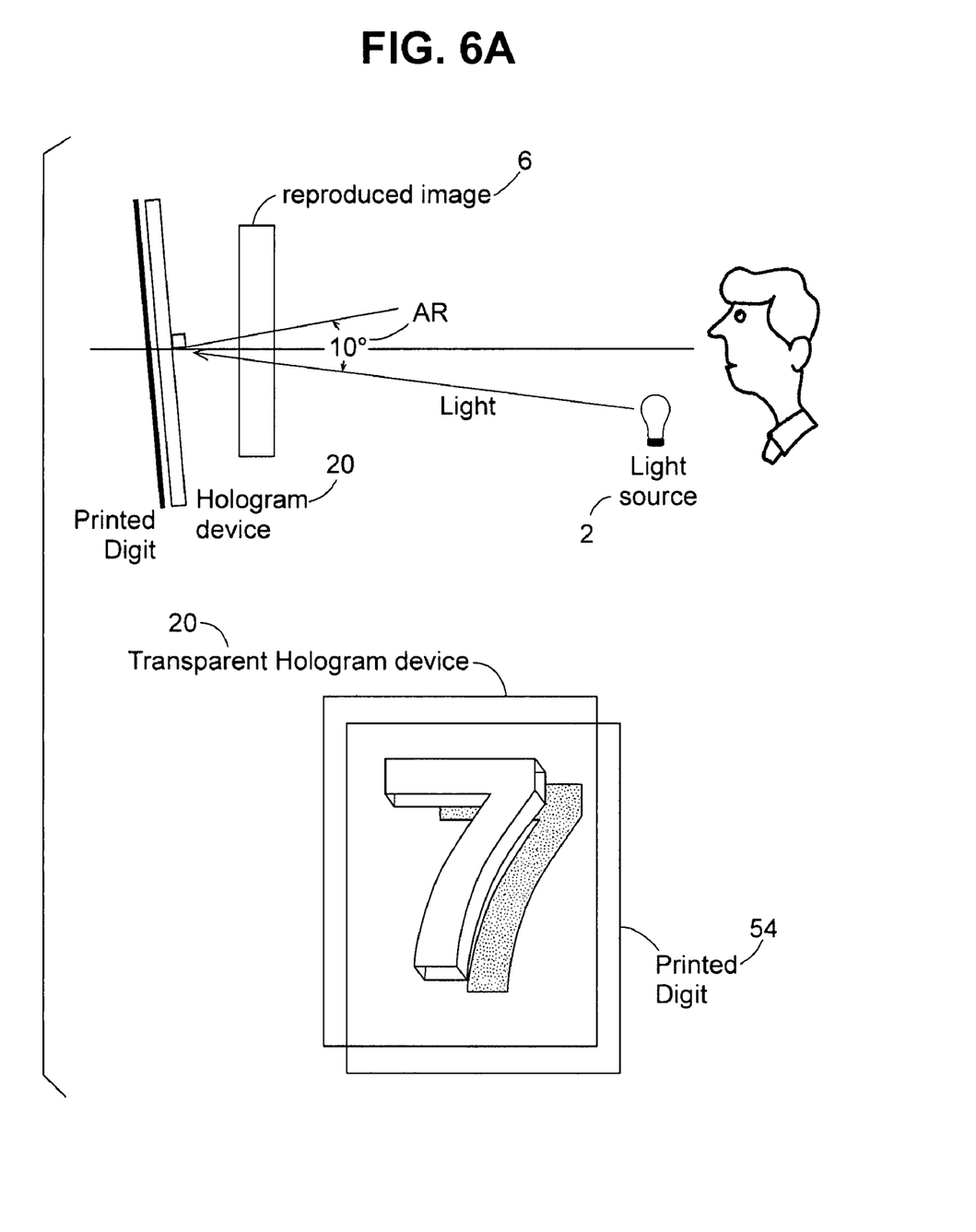
FIG. 6A illustrates a hologram device made from the second master hologram of FIG. 4 as seen by a viewer.
Figure 6B:
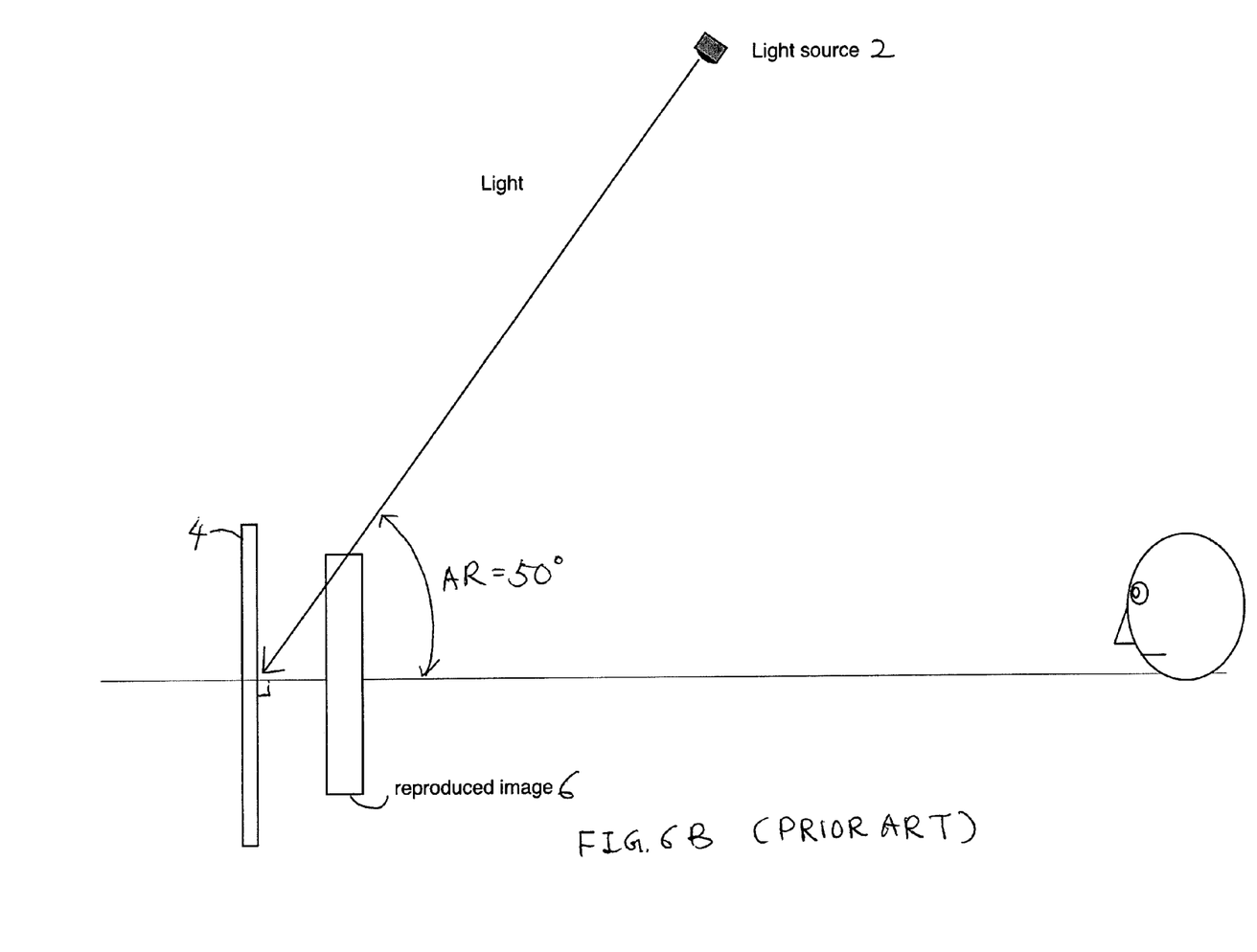
FIG. 6B illustrates a conventional hologram device as seen by a viewer.
Figure 6C:
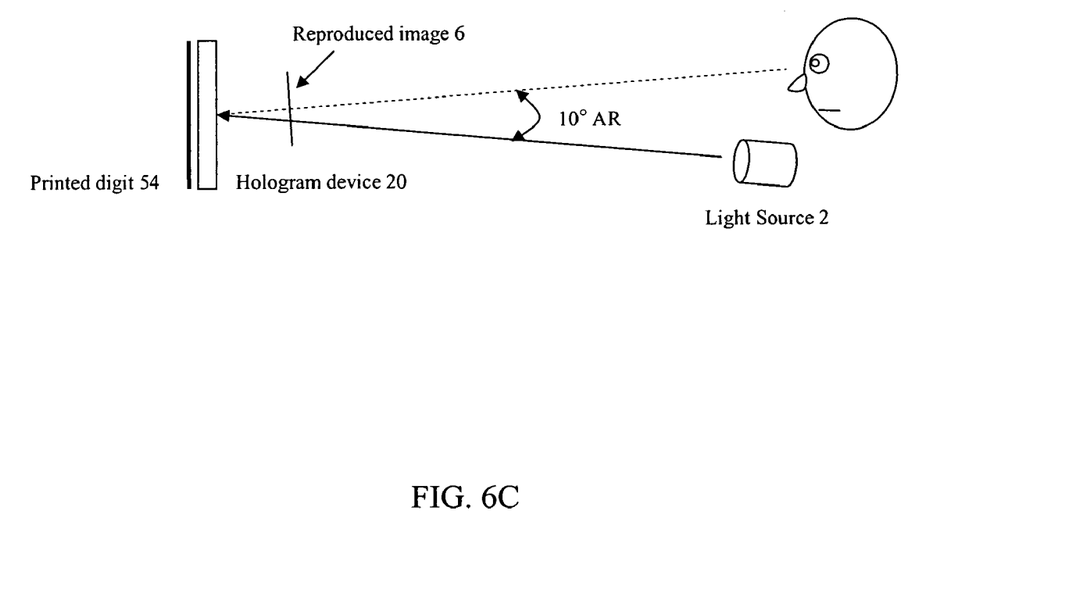
FIG. 6C illustrates a hologram device made from the second master hologram of FIG. 4 as seen by a viewer.

Referring to FIG. 6A, the image recorded on the hologram device 20 is reconstructed as reproduced image 6 when the hologram device is exposed to white light coming from the front at the same angle as the reference beam angle used during its recording.

To make the hologram device 20, copies of the narrow angle master hologram H2 are made on transparent photosensitive film backed with a clear adhesive. They are adhered over a sticker 54 printed with flat (2D) images that match the holographic images recorded on the photosensitive film. The sticker is most effective if it is light colored with the image printed in dark ink. The ink of the printed number acts as the dark background behind the matching hologram, which maximizes the brightness and contrast when the hologram is exposed to an appropriate light source. The holograms 20 illuminate when exposed to light from the front at a narrow angle of reconstruction of preferably less than 30 degrees from the perpendicular line of the hologram device 20. When such a light source is not present, the holograms 20 are transparent and the flat image 54 printed on the stickers underneath are visible.

Another application of the present invention is in alignment of one structure to another. The holograms 20 shift in color and brightness depending on the angle at which the light strikes the hologram surface. As shown in the table of FIG. 8B, the reconstructed image becomes a very bright orange color at a predetermined resonant angle.

The color at the angle of reconstruction (zero offset) and the rate of color change against the angular displacement can be changed to suit different applications as appropriate. The color at the angle of reconstruction can be set by a) choice of laser wavelength together with film/plate wavelength sensitivity, b) fine tuning of the optical geometry during transfer, or c) chemical and/or thermal conditioning of the film/plate, or d) a combination of the above. This color becomes the center of the light spectrum around the resonance (reconstruction) angle. For instance, if green is the chosen as the "center" color, then deviation in one direction turns the color progressively to blue then violet. In the other direction, the color turns to yellow to orange to red.

The rate of change (angular displacement vs. color) can be controlled by broadening or limiting the viewing angle of the hologram. Broadening would yield more precision, providing less color shift per degree of angular displacement. Limiting would have the converse effect. The viewing angle can be manipulated, for example, by changing the ratio in sizes between the H1 and H2 during the transfer process. For instance, a very large H1 transferred to a small H2 broadens the viewing angle. Using lasers with different wavelengths in the creation of H1 vs. H2 also can contribute to the viewing angle.

Figure 8A:
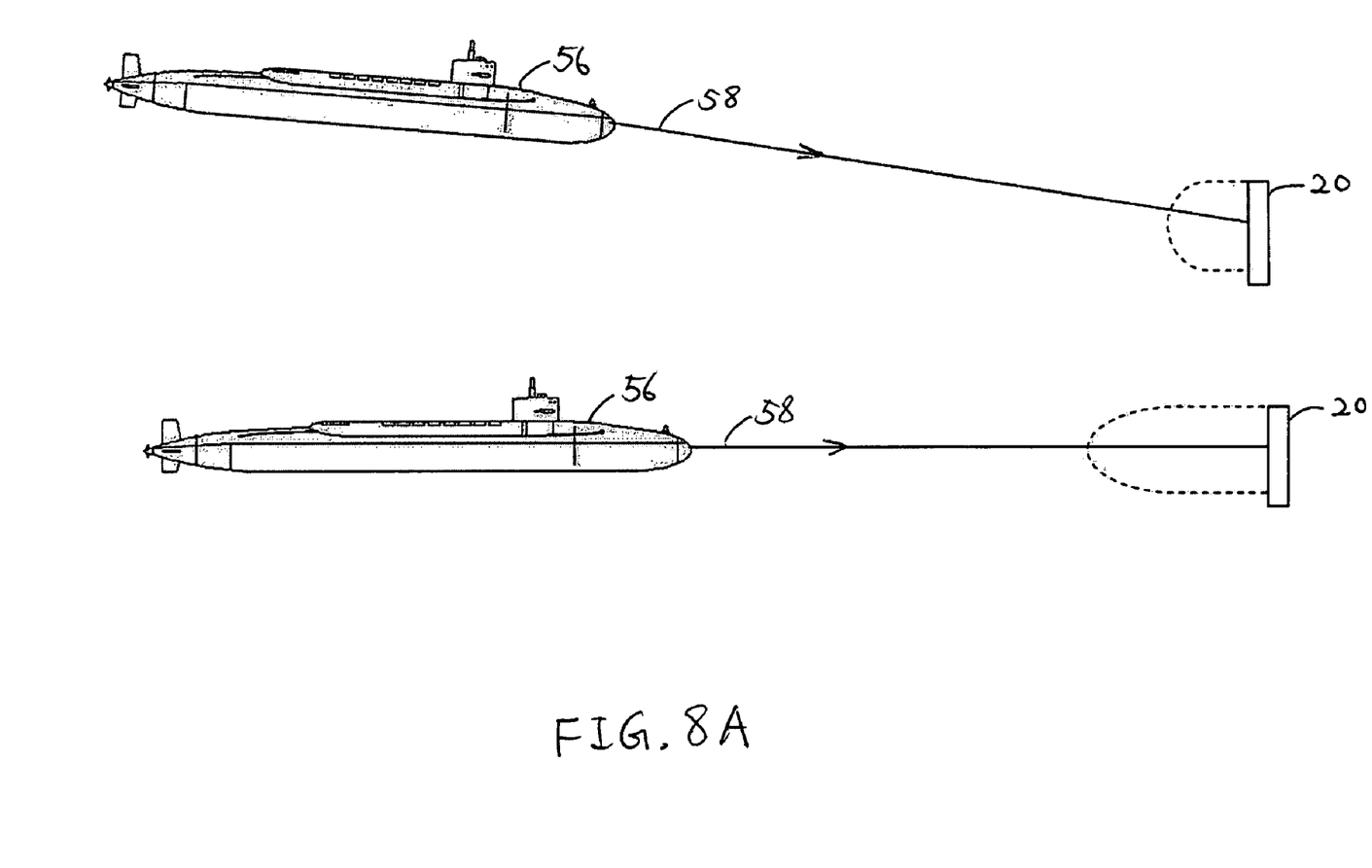
FIG. 8A illustrates a method of aligning an apparatus using the hologram according to the present invention.
Figure 8B:
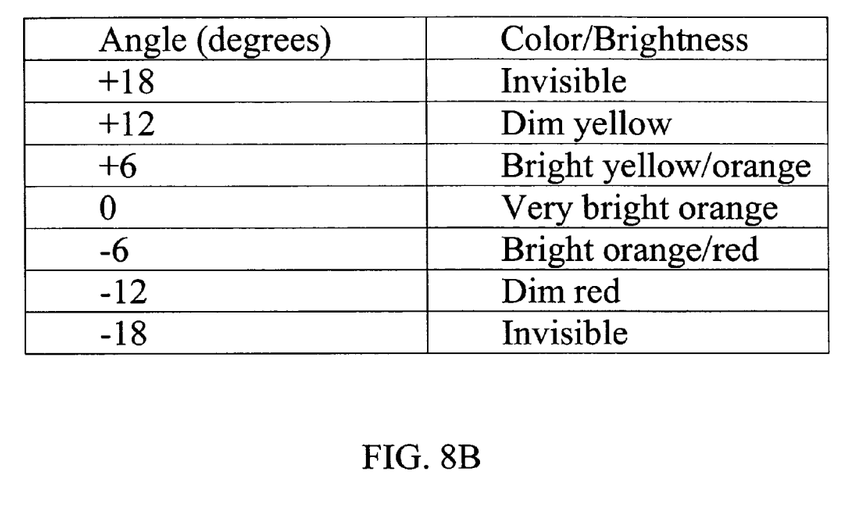
FIG. 8B is a table of color/brightness of the reconstructed hologram image as a function of angular offset of the apparatus being aligned according to the present invention.

In FIG. 8B, the predetermined angle is zero degrees relative to the perpendicular line to the hologram 20 surface with the center color being orange. This property can be used for angular positioning or alignment, such as a left-right-center-up-down alignment indication when truck or fork lift drivers approach a dock or shelf, or when a rocket docks to a space station since a minor shift in the angle creates a highly visible shift in color and brightness, or optical fiber alignment, providing greater precision than was possible previously. FIG. 8A shows the hologram 20 being used to align a submarine 56 approaching a docking station (not shown) having the hologram 20 as an attachment. The light 58 coming from the submarine 56 strikes the hologram 20. The top submarine is coming in slightly off axis from the perpendicular line to the hologram surface 20 as the color is yellow and is not very bright. On the other hand, the bottom submarine is coming in directly on the axis. As a result, the color of the image in the hologram 20 is orange and is very bright.

Figure 7A:
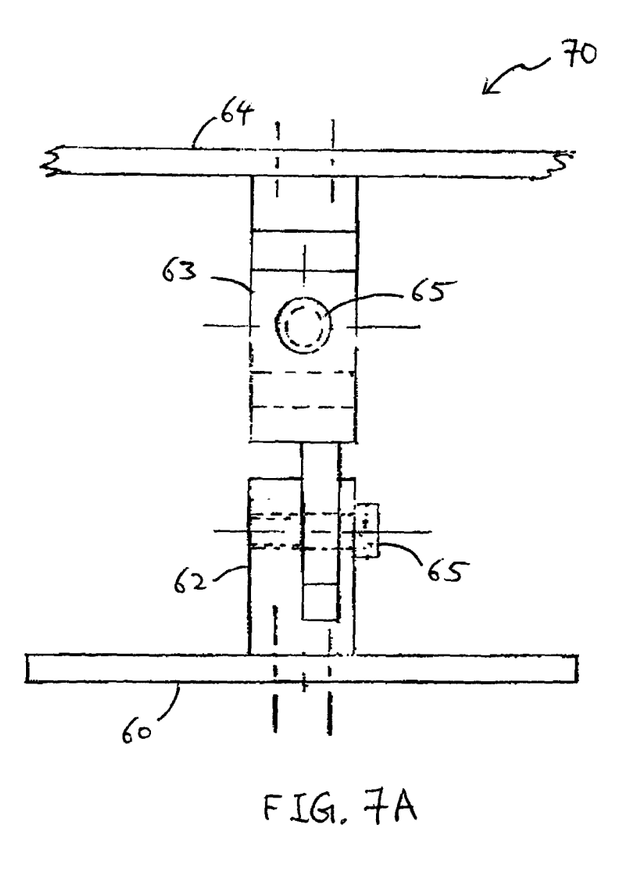
FIGS. 7A and 7B show a plan view and a side view of a mounting bracket assembly for mounting a hologram device.
Figure 7B:
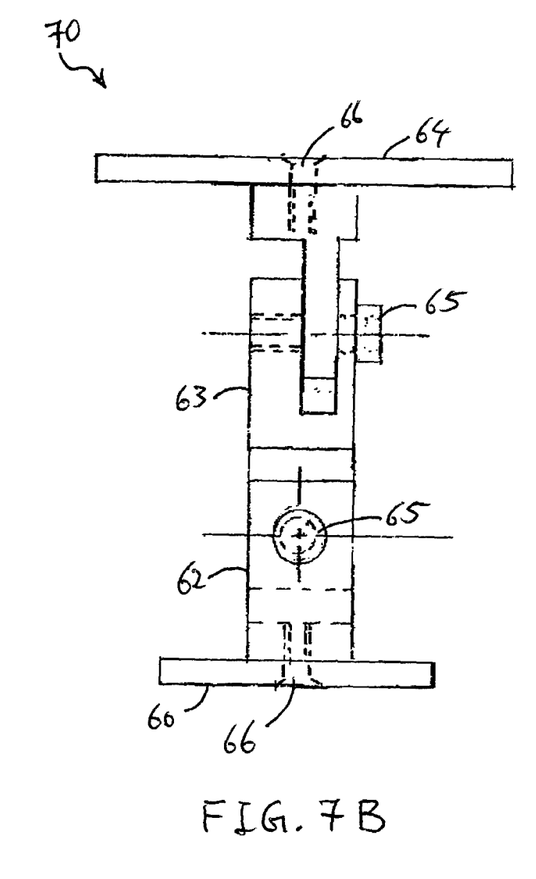
Figure 7C:
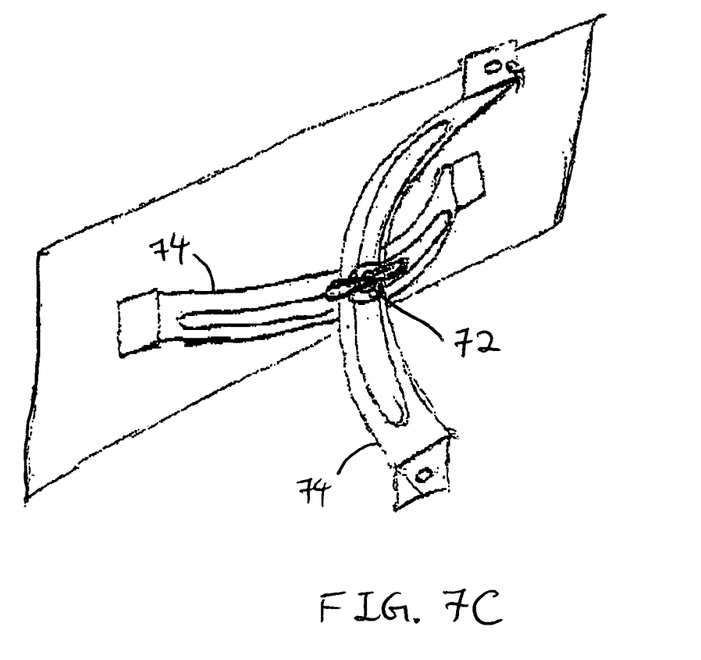
FIG. 7C illustrates an alternate mounting bracket assembly for mounting the hologram device.

Referring to FIGS. 7A-C, the photosensitive film holograms 20 mated with the stickers 54 are applied to a mounting bracket 70. The bracket includes a mounting plate 60, up/down swivel member 62 attached to the mounting plate, left/right swivel member 63 rotatably coupled to the up/down swivel member 62 by a screw 65, left/right swivel member and numbers plate 64 on which the hologram 20 is mounted or affixed. The left/right swivel member 63 is rotatably coupled to the up/down swivel member 62 by the screw 65 and attached to the numbers plate 64 by a screw 66. The bracket 70 is adjustable for achieving the optimal viewing angle. FIG. 7C shows an alternative adjustment mechanism where a screw 72 is tightened with a nut in two slotted C-shaped or curved arms 74.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A narrow angle hologram device comprising:
   a photosensitive film; and
   a 3-dimensional holographic image of an object recorded in the photosensitive film without a longitudinal slit in an object beam light path, the 3-dimensional holographic image having a narrow angle of reconstruction with the narrow angle being defined as a predefined angle that falls within a range of −30 degrees to +30 degrees, inclusive, relative to a perpendicular line to a surface of the photosensitive film,
   a recorded angle of the object in the photosensitive film being less than or equal to 30 degrees wherein the recorded angle is defined as an angle between an optical axis of a reference beam and a line perpendicular to a recording surface of the photosensitive film;
   wherein:
      the 3-dimensional holographic image is recreated towards an observer when a light from a white light source illuminates the photosensitive film at the narrow angle; and
      a recreation angle, between an optical axis of the illumination light that hits a common point on the surface of the photosensitive film and a line from the common point to a center of the recreated image of the object, is less than or equal to 30 degrees.

2. The narrow angle hologram device according to claim 1, further comprising a printed image of the object attached to the photosensitive film such that the printed image is aligned with the corresponding recorded 3-dimensional image.

3. The narrow angle hologram device according to claim 2, further comprising an adjustable mounting bracket that supports the photosensitive film, the mounting bracket capable of being adjusted in the left, right, up and down directions.

4. The narrow angle hologram device according to claim 2, wherein the printed image of the object is disposed under the recorded 3-dimensional holographic image such that the light hits the recorded 3-dimensional holographic image first.

5. The narrow angle hologram device according to claim 1, wherein the recreated image varies in color or brightness or both as the angle of illumination by the light varies, wherein a variation in the recreated image is used for alignment of an apparatus having a source of the illumination.

6. The narrow angle hologram device according to claim 5, wherein a rate of variation in color or brightness as a function of the illumination angle is predefined during manufacture of the hologram device or its master hologram according to an angular alignment accuracy required for the apparatus.

7. The narrow angle hologram device according to claim 1, wherein the narrow angle is a predefined angle that falls within a range of −20 degrees to +20 degrees, inclusive, relative to a perpendicular line to a surface of the photosensitive film.

8. The narrow angle hologram device according to claim 1, wherein the 3-dimensional holographic image is recorded from another 3-dimensional holographic image of the object, the another 3-dimensional holographic image being generated by another hologram device illuminated by a laser light.

9. The narrow angle hologram device according to claim 1, wherein the hologram device is a reflection hologram device in which a viewer and the white light source are on the same side of the hologram device.

10. The narrow angle hologram device according to claim 9, further comprising a printed image of the object disposed under the photosensitive film such that the printed image is aligned with the corresponding recorded 3-dimensional holographic image.

11. The narrow angle hologram device according to claim 9, wherein the narrow angle is a predefined angle that falls within a range of −20 degrees to +20 degrees, inclusive, relative to a perpendicular line to a surface of the photosensitive film.

12. The narrow angle hologram device according to claim 9, wherein the 3-dimensional holographic image is recorded from another 3-dimensional holographic image of the object, the another 3-dimensional holographic image being generated by another hologram device illuminated by a laser light.

13. The narrow angle hologram device according to claim 1, wherein the recording holographic film is a master hologram and the narrow angle hologram device is a duplicate of the master hologram.

14. A narrow angle hologram device comprising:
a photosensitive film;
a 3-dimensional holographic image of an object recorded in the photosensitive film, the 3-dimensional holographic image having a narrow angle of reconstruction with the narrow angle being defined as a predefined angle that falls within a range of −30 degrees to +30 degrees, inclusive, relative to a perpendicular line to a surface of the photosensitive film,
wherein:
the 3-dimensional holographic image is recreated towards an observer when a light from a white light source illuminates the photosensitive film at the narrow angle; and
a recreation angle, between an optical axis of the illumination light that hits a common point on the surface of the photosensitive film and a line from the common point to a center of the recreated image of the object, is less than or equal to 30 degrees; and
a printed image of the object attached to the photosensitive film such that the printed image is aligned with the corresponding recorded 3-dimensional image.

15. The narrow angle hologram device according to claim 14, further comprising an adjustable mounting bracket that supports the photosensitive film, the mounting bracket capable of being adjusted in the left, right, up and down directions.

16. The narrow angle hologram device according to claim 14, wherein the recreated image varies in color or brightness or both as the angle of illumination by the light varies, wherein a variation in the recreated image is used for alignment of an apparatus having a source of the illumination.

17. The narrow angle hologram device according to claim 16, wherein a rate of variation in color or brightness as a function of the illumination angle is predefined during manufacture of the hologram device or its master hologram according to an angular alignment accuracy required for the apparatus.

18. The narrow angle hologram device according to claim 14, wherein the printed image of the object is disposed under the recorded 3-dimensional holographic image such that the light hits the recorded 3-dimensional holographic image first.

19. The narrow angle hologram device according to claim 14, wherein the hologram device is a reflection hologram device in which a viewer and the white light source are on the same side of the hologram device.

20. A narrow angle hologram device comprising:
a photosensitive film;
a 3-dimensional holographic image of an object recorded in the photosensitive film, the 3-dimensional holographic image having a narrow angle of reconstruction with the narrow angle being defined as a predefined angle that falls within a range of −30 degrees to +30 degrees, inclusive, relative to a perpendicular line to a surface of the photosensitive film,
wherein:
the 3-dimensional holographic image is recreated towards an observer when a light from a light source illuminates the photosensitive film at the narrow angle;
a recreation angle, between an optical axis of the illumination light that hits a common point on the surface of the photosensitive film and a line from the common point to a center of the recreated image of the object, is less than or equal to 30 degrees; and
the recreated image varies in color or brightness or both as the angle of illumination by the light varies, wherein a variation in the recreated image is used for alignment of an apparatus having a source of the illumination.

21. The narrow angle hologram device according to claim 20, wherein a rate of variation in color or brightness as a function of the illumination angle is predefined during manufacture of the hologram device or its master hologram according to an angular alignment accuracy required for the apparatus.

* * * * *